July 11, 1967   JIRO ISHIKAWA ETAL   3,330,165
METHOD OF AND DEVICE FOR COMPENSATING
FOR ERRORS IN TRANSMITTED ROTATIONAL
ANGLES OF WORM GEAR DRIVES
Filed March 8, 1965
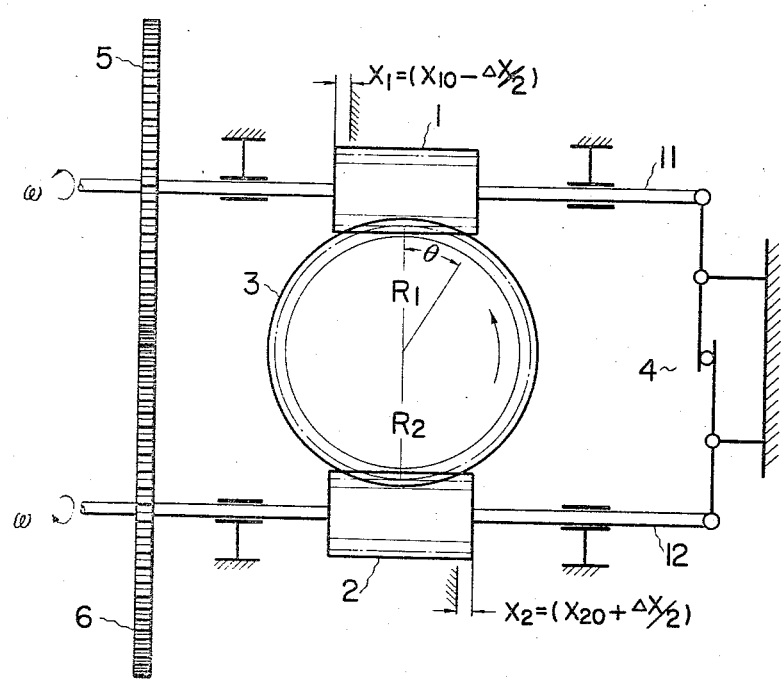
INVENTOR
JIRO ISHIKAWA
MASAO TOMII
BY
ATTORNEYS

3,330,165
METHOD OF AND DEVICE FOR COMPENSATING FOR ERRORS IN TRANSMITTED ROTATIONAL ANGLES OF WORM GEAR DRIVES

Jiro Ishikawa, Shinjuku-ku, Tokyo-to, and Masao Tomii, Kawasaki-shi, Japan, assignors to Hamai Sangyo Kabushiki Kaisha, Shinagawa-ku, Tokyo-to, Japan, a joint-stock company of Japan
Filed Mar. 8, 1965, Ser. No. 438,001
Claims priority, application Japan, Mar. 11, 1964, 39/13,272
4 Claims. (Cl. 74—409)

This invention relates to a novel method of compensating for errors in transmitted rotational angles of worm gear drives.

Errors in transmitted rotational angles of worm gear drives generally appear in a recurrent form having a period corresponding to one revolution of the worm wheel, which can be expressed as follows according to a Fourier series:

$$\epsilon(\theta) = \sum_{n=1}^{\infty} e_n \sin(n\theta + \phi_n) \qquad (1)$$

where $\epsilon(\theta)$ represents the error in the transmitted rotational angle of the worm gear drive, $\theta$ the rotational angle of the worm wheel, $e_n$ the amplitude of the $n$th higher harmonic component contained in the error and $\phi_n$ the phase angle of $e_n$.

Among various errors represented by Equation 1, the error $e_1$ which is caused by eccentricity is usually the largest, and causes periodic leads and lags in the form of a sine wave of a period corresponding to one revolution of the worm wheel, so that, if this error could be compensated for, the error as a whole could be decreased to a fractional value.

It is therefore the principal object of this invention to provide a novel method of compensating for this error caused by eccentricity as well as any selected higher harmonics thereof.

The principle of this invention is based on a method characterized in that two or more worms are disposed in driving engagement with a single worm wheel, the shafts of said worms are journalled to be displaceable in the axial direction, and the rotational error of the worm wheel is detected by the axial displacement of the worms and corrected automatically.

More particularly, the method of compensating for errors in transmitted rotational angles of a worm gear drive comprises the steps of disposing at least two worms in driving engagement with a single worm wheel, journalling each worm or its supporting shaft to be displaceable in the axial direction and controlling the sum of the distances between the end surface of each worm, or the end of its supporting shaft, and a fixed point to be always constant, as shown in the figure.

While further objects and advantages of the invention are distinctly pointed out in the appended claims, the organization and method of operation thereof can be more fully understood from the following detailed description with reference to the accompanying drawings, in which the figure is a schematic representation of one embodiment of this invention wherein two worms are utilized.

The principle of this invention will now be considered by referring to the figure which schematically represents the simplest embodiment of this invention utilizing two worms 1 and 2 cooperating with a single worm wheel 3. These worms are mounted on spaced parallel worm shafts 11 and 12, respectively, which are journalled in suitable bearings to be displaceable in the axial direction. Corresponding ends of the worm shafts 11 and 12 are interconnected by a lever mechanism 4 so that axial displacement of one shaft causes the other shaft to displace in the same direction by the same amount. Although not shown, the left hand end of the shaft 11 is driven by a suitable driving means and the shaft 12 is driven by the shaft 11 through spur gears 5 and 6. If it is assumed now that the worm wheel 3 is driven only by the worm 1, that other mechanisms are not provided, and that the worm 1 is not displaceable in the axial direction and is rotated through an angle of $\omega$, then following relation holds between $\omega$ and $\theta$ the rotational angle of the worm wheel 3.

$$\omega = z\{\theta + \epsilon_1(\theta)\} = z\{\theta + \sum_{n=1}^{\infty} e_n \sin(n\theta + \phi_n)\} \qquad (2)$$

where $z$ represents the number of teeth of the worm wheel. It is to be noted that in this case the worm is of the single thread type.

If $d\theta$ represents the rotational angle of the worm wheel caused by $d\omega$ rotation of the worm the relation between $d\omega$ and $d\theta$ can be represented as follows:

$$d\omega = z\left\{1 + \frac{d\epsilon_1(\theta)}{d\theta}\right\} d\theta \qquad (3)$$

Further, by assuming that the tooth surface of the worm advances by $ds$ when the worm is rotated by $d\omega$, and $m$ represents a module, $$\frac{d\omega}{2\pi} = \frac{ds}{\pi n}$$

therefore $$d\omega = \frac{2ds}{m}$$

and by substituting this relation in Equation 3, the following equation is obtained.

$$ds = \frac{zm}{2}\left\{1 + \frac{d\epsilon_1(\theta)}{d\theta}\right\} d\theta \qquad (4)$$

Equation 4 means that said advance of $ds$ has the same effect as that caused when the center distance of the worm gear drive has made an apparent change of $$R_1 = R_0\left\{1 + \frac{d\epsilon_1(\theta)}{d\theta}\right\}$$

where $$R_0 = \frac{zm}{2}$$

In the same manner, when the worm 2 is used, the following equation holds.

$$R_2 = R_0\left\{1 + \frac{d\epsilon_2(\theta)}{d\theta}\right\} = R_0\left\{1 + \frac{d\epsilon_1(\theta \pm \pi)}{d\theta}\right\}$$

where $\epsilon_2(\theta)$ represents the error in the transmitted rotational angle which is displaced in phase by $\pi$ from $\epsilon_1(\theta)$. Accordingly, $$\epsilon_2(\theta) = \epsilon_1(\theta \pm \pi) = \sum_{n=1}^{\infty} e_n \sin(n\theta \pm n\pi + \phi_n)$$

Assuming now that the shaft 11 is fixed in the axial direction, whereas the shaft 12 is set free to move axially so as to drive the worm wheel 3 by both worms 1 and 2 and that the worm 1 is driven by $d\omega$, then the axial displacement $\Delta x$ of the worm 2 can be expressed by the following equation.

$$\Delta x = R_1 \cdot d\theta = R_2 \cdot d\theta = (R_1 - R_2) d\theta = \left\{\frac{d\epsilon_1(\theta)}{d\theta} - \frac{d\epsilon_2(\theta)}{d\theta}\right\} d\theta \qquad (5)$$

If then the shaft 11 carrying the worm 1 is set to be axially displaceable, and the shaft 12 carrying the worm 2 is restored by $\Delta x/2$, the worm 1 will also be displaced by $\Delta x/2$ so that the relative positions between worms 1 and 2 will be the same as before rotated by $d\omega$. However, as the worms have been shifted in the axial direction by $\Delta x/2$ the rotation of the worm wheel is slightly corrected so that the relation between $d\omega$ and $d\theta$ can be expressed as follows:

$$d\omega = z \left\{ 1 + \frac{d\epsilon_1(\theta)}{d\theta} - \frac{\frac{d\epsilon_1(\theta)}{d} - \frac{d\epsilon_2(\theta)}{d}}{2} \right\}$$

$$d\theta = z \left[ 1 + \frac{1}{2}\frac{d\epsilon_1(\theta)}{d\theta} + \frac{d\epsilon_2(\theta)}{d\theta} \right] d\theta \quad (6)$$

From this, the relation between $\omega$ and $\theta$ can be shown by $$\omega = z\left\{\theta + \frac{1}{2}\epsilon_1(\theta) + \frac{1}{2}\epsilon_2(\theta)\right\} = z\left\{\theta + \sum_{n=1}^{\infty} e_{2n} \sin(2n + \phi_{2n})\right\} \quad (7)$$

As can be clearly noted by comparing Equation 7 with Equation 2, by controlling the relative axial positions of the two worms so that they have a fixed relation, the original error $$\sum_{n=1}^{\infty} e_n \sin(n\theta + \phi_n)$$

can be reduced to $$\sum_{n=1}^{\infty} e_{2n} \sin(2_n\theta + \phi_{2n})$$

thus compensating for the error due to eccentricity and higher harmonic components of odd orders. It is to be particularly noted that a simple lever mechanism as shown in the figure can provide this compensation.

Thus, according to this invention, by utilizing a simple compensating device utilizing only two worms it is possible not only to minimize errors of worm gear drives but also to maintain high accuracy during the operation thereof because, even when the worms and the cooperating worm wheel wear, errors caused thereby are automatically detected from time to time and corrected at once. Moreover, two worms can equally share the load because they are stable when their axial loads balance each other.

In the case where three worms are used, these worms are disposed at angular intervals of 120 degrees, and, by so controlling any one of the worms that the sum of the displacements of all worms from fixed coordinates is always constant, the error components exclusive of those of multiples of 3 are compensated for, the remaining error becoming $$\epsilon(\theta) = \sum_{n=1}^{\infty} e_{3n} \sin(3n\theta + \phi_{3n})$$

Similarly, in the case where four worms are used, components of higher harmonics exclusive of multiples of 4 are compensated for, whereby the remaining error can be expressed as follows:

$$\epsilon(\theta) = \sum_{n=1}^{\infty} e_{4n} \sin(4n\theta + \theta_{4n})$$

Cases wherein more than four worms are used can be considered in exactly the same manner.

In accordance with the provisions of the patent statutes we have shown and described the principle of this invention but it should be understood that this invention is by no means limited to the illustrated embodiments and that many changes may be made therein without departing from the true scope of the invention as defined in the appended claims.

What we claim is:

1. A method of compensating for errors in transmitted rotational angles of a worm gear drive, which comprises disposing at least two worms in driving engagement with a single worm wheel, journalling each worm for axial displacement relative to a respective datum point, drivingly interconnecting all the worms, directly driving only one of the worms, and, responsive to axial displacement of one worm relative to its respective fixed datum point, displacing each of the other worms axially relative to the respective fixed datum points by amounts such as to maintain constant the sum of the distance of each worm from its respective datum point.

2. A device for compensating for errors in transmitting rotational angles of a worm gear drive, said device comprising, in combination, a worm wheel; at least two worms in driving engagement with said worm wheel; means drivingly interconnecting all of said worms; means driving one worm; means journaling each worm for axial displacement relative to a respective datum point; means mechanically interconnecting corresponding ends of said worms and operable, responsive to axial displacement of one worm relative to its respective fixed datum point, to displace each of the other worms in the same direction and through axial distances, relative to the respective fixed datum points, having magnitudes such as to maintain constant the sum of the distances of each worm from its respective datum point.

3. A device, as claimed in claim 2, in which said mechanical means comprises mechanical lever systems.

4. A device, as claimed in claim 3, in which each lever system comprises two first class levers having equal length arms, each lever having one end of one arm operatively connected to a corresponding end of a worm, and the ends of the other arms of the two levers being engaged with each other.

References Cited

UNITED STATES PATENTS

| | | | |
|---|---|---|---|
| 645,463 | 3/1900 | Diffenderffer | 74—410 |
| 2,765,668 | 10/1956 | Milne | 74—409 |
| 3,252,349 | 5/1966 | Widdrington | 74—427 |

ROBERT M. WALKER, *Primary Examiner.*

DAVID J. WILLIAMOWSKY, *Examiner.*

L. H. GERIN, *Assistant Examiner.*